A. R. SWOBODA.
TELEGRAPH SYSTEM.
APPLICATION FILED APR. 22, 1918.
1,362,648.
Patented Dec. 21, 1920.
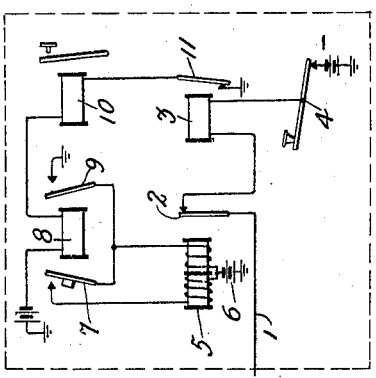
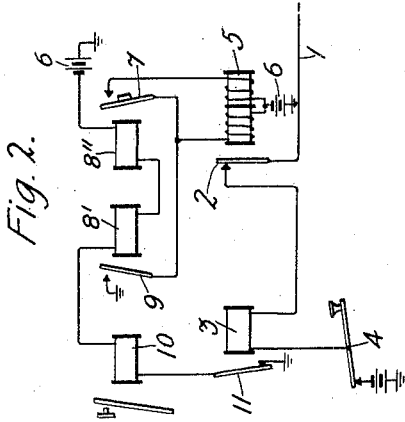
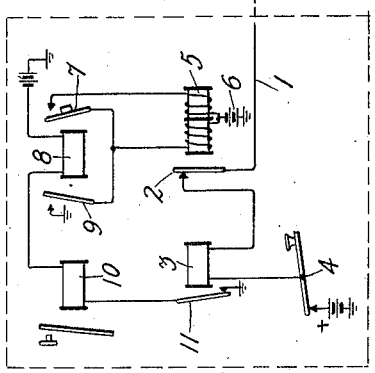
Inventor:
Adolph R. Swoboda.
by J.E.Roberts
Att'y.

UNITED STATES PATENT OFFICE.

ADOLPH R. SWOBODA, OF NEWARK, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,362,648.   Specification of Letters Patent.   Patented Dec. 21, 1920.

Application filed April 22, 1918. Serial No. 230,191.

*To all whom it may concern:*

Be it known that I, ADOLPH R. SWOBODA, a citizen of the United States, residing at Newark, in the county of Essex, State of New Jersey, have invented certain new and useful Improvements in Telegraph Systems, of which the following is a full, clear, concise, and exact description.

This invention relates to telegraph systems and more particularly to leak nullifying means for telegraph systems.

The object of this invention is to provide a new and improved means for nullifying or rendering ineffective, with respect to intermediate stations on the line, the current leaks between terminal stations due to resistance grounds upon a line.

In accordance with the features of this invention, there is provided at each end of the line, in a local circuit, a double-wound relay, the windings of which are so arranged that their influences are opposed when the relay is energized through both windings. These windings may be supplied with current from a battery and connected in multiple to ground. The circuit leading from this ground to the windings is adapted to be interrupted at two points by armatures controlled by another relay, which other relay is adapted to be deënergized whenever the line relay at the terminal station becomes deënergized. The effect of this is to cause the momentary energization of one of the windings of the double-wound relay before the energization of the other winding of said relay, so that line switches which are controlled by one of said double-wound relays at each terminal station, are momentarily opened to open the line at each terminal station and take battery off of the line at each end thereat so that the line relay armatures at any intermediate stations may be retracted and thus put in condition to receive signals.

In the drawing, Figure 1 represents a circuit arrangement of a system wired in accordance with this invention; and Fig. 2 represents a modified form of the arrangement shown in Fig. 1, for one terminal station, the apparatus at each end being identical.

In accordance with the arrangement shown in Fig. 1, there is provided at the terminal stations a line 1, a line switch 2, a line relay 3 and a sending key 4 in series with each other. The line switch 2 is adapted to be controlled by a double-wound relay 5 which may be energized by current from battery 6. One winding of this relay 5 is connected through armatures 7 and 9 to a ground, whereas the other winding is connected through armature 9 alone. Armatures 7 and 9 are controlled by the action of a relay 8 which is in series with battery 6, a sounder 10 and a grounded armature 11, which armature 11 is controlled by the action of line relay 3. Under normal conditions the sending key 4 is closed and line relay 3 is energized, holding armature 11 against the ground contact, thereby causing relay 8 and sounder 10 to normally remain energized. Relay 8 being energized, armatures 7 and 9 are pulled up, holding open their contacts. Because of this normal position of armatures 7 and 9, relay 5 is not normally energized, and therefore line switch 2 normally holds the line closed. Such an arrangement of apparatus as this is provided at each end of the line. The intermediate stations, however, are not so accessible for adjustment and it often happens that when the line at one end is opened for signaling purposes, the armatures 12 of the line relays 13 at intermediate stations remain pulled up because of the effect of the leakage currents from the other terminal station on those relays. To eliminate the effect of these currents, it becomes necessary, therefore, before transmitting signals to a line, to cause the momentary opening of the line so that the effect of these leakage currents may be overcome. To accomplish this object, therefore, when the operator at a terminal station desires to transmit messages, his key 4 is depressed to open its contact and take battery off of the line. This causes the deënergization of line relay 3 at each end of the line which permits armatures 11 to drop back taking ground off of sounders 10 and relays 8. The deënergization of relays 8 permits armatures 7 and 9 to be retracted. Because of the fact that armatures 9 are quicker in their action than armatures 7, the ground is put on armatures 9 and one winding of relays 5 at each end of the line before armatures 7 have closed to put the ground on the other armature of relays 5. This causes the unbalanced effect of one winding of relays 5 to exert its influence on switches 2 and momentarily open the circuit at each end of the line until armatures 7 have closed, whereupon the influence of the other winding of relays 5 becomes effective and permits line switches 2 to close. It is clear, therefore, that each time a sending key is depressed, the line at each end will be opened for an instant of time corresponding to the time between the closing of the contact of armatures 9 and the contact of armatures 7.

The arrangement shown in Fig. 2 is substantially identical with that shown in Fig. 1 with the exception that only one terminal station is shown and armature 7 and armature 9 are now actuated by separate relays 8' and 8" rather than by one relay 8.

What is claimed is:

1. In a telegraph system, a line, a sending key, a relay and a switch in said line at each end thereof, a normally closed local circuit including a grounded armature controlled by each line relay, a relay in the local circuit, a differential relay controlling the line switch, and means controlled by the local circuit relays to cause a momentarily unbalanced magnetic force in the differential relays and actuate the line switches whenever a sending key is actuated.

2. In a telegraph system, a line, a sending key, a switch in the line at each end thereof, a differential relay controlling the operation of each switch, said relays being normally deënergized, and means controlled by the actuation of a sending key to cause a momentarily unbalanced magnetic force in the differential relays to actuate the line switches.

3. In a telegraph system, a line, a sending key, a switch in the line at each end thereof, a normally deënergized differential relay adapted to control a line switch, means controlled by the actuation of a sending key to produce a momentarily unbalanced magnetic force in the differential relays to actuate the line switches, and means to equalize the unbalanced magnetic force immediately thereafter.

4. In a telegraph system, a line, a sending key and a differential relay in a local circuit at each end of the line, means controlled by the actuation of a key to produce a momentarily unbalanced magnetic force in the differential relays, and circuit breaking means in the line controlled by the differential relays.

In witness whereof, I hereunto subscribe my name this 18th day of April A. D., 1918.

ADOLPH R. SWOBODA.